(12) United States Patent
Jones

(10) Patent No.: US 6,374,630 B1
(45) Date of Patent: Apr. 23, 2002

(54) CARBON DIOXIDE ABSORPTION HEAT PUMP

(75) Inventor: Jack A. Jones, Los Angeles, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/853,931

(22) Filed: May 9, 2001

(51) Int. Cl.[7] .......................... F25B 43/04; F25B 15/00
(52) U.S. Cl. ............................................ 62/476; 62/112
(58) Field of Search .............................. 62/324.2, 476, 62/483, 101, 102, 111, 112; 165/104.12

(56) References Cited

U.S. PATENT DOCUMENTS

| | | | |
|---|---|---|---|
| 4,433,554 A | * | 2/1984 | Rojey et al. ................. 62/112 |
| 4,448,033 A | | 5/1984 | Rojey et al. |
| 4,475,353 A | | 10/1984 | Lazare |
| 4,674,297 A | * | 6/1987 | Vobach ........................ 62/476 |
| 4,813,242 A | | 3/1989 | Wicks |
| 5,335,510 A | | 8/1994 | Rockenfeller et al. |
| 5,360,057 A | | 11/1994 | Rockenfeller et al. |
| 5,503,222 A | | 4/1996 | Dunne |
| 6,112,547 A | * | 9/2000 | Spauschus et al. ........... 62/476 |

* cited by examiner

Primary Examiner—Henry Bennett
Assistant Examiner—Chen-Wen Jiang
(74) Attorney, Agent, or Firm—John H. Kusmiss

(57) ABSTRACT

A carbon dioxide absorption heat pump cycle is disclosed using a high pressure stage and a super-critical cooling stage to provide a non-toxic system. Using carbon dioxide gas as the working fluid in the system, the present invention desorbs the $CO_2$ from an absorbent and cools the gas in the super-critical state to deliver heat thereby. The cooled $CO_2$ gas is then expanded thereby providing cooling and is returned to an absorber for further cycling. Strategic use of heat exchangers can increase the efficiency and performance of the system.

14 Claims, 1 Drawing Sheet

CARBON DIOXIDE ABSORPTION HEAT PUMP

ORGIN OF INVENTION

The invention described hereunder was made in the performance of work under a NASA contract, and is subject to the provisions of Public Law 96-517 (35 U.S.C. 202) in which the Contractor has elected not to retain title.

BACKGROUND OF THE INVENTION

1. Field of the Invention

The invention is directed generally to heat pumps, and more specifically to a high pressure heat pump using carbon dioxide as the circulating fluid.

2. Description of Related Art

Heat pumps are well known in the art. A heat pump is simply a device for delivering heat or cooling to a system, whereas a refrigerator is a device for removing heat from a system. Thus, a refrigerator may be considered a type of heat pump. Throughout the application, the invention will be referred to as a heat pump with the understanding that the designation of refrigerator could be substituted without changing the operation of the device.

In absorption heat pumps, an absorbent such as water absorbs the refrigerant, typically ammonia, thus generating heat. When the combined solution is pressurized and heated further, the refrigerant is expelled. When the refrigerant is pre-cooled and expanded to a low pressure, it provides cooling. The low pressure refrigerant is then combined with the low pressure depleted solution to complete the cycle.

Many current absorption heat pump/refrigerators make use of either a water-ammonia couple, or a water-lithium bromide. These two absorption couples suffer from certain drawbacks. The water-ammonia couple raises security problems in view of the toxicity and flammability of ammonia, and LiBr is corrosive and very failure prone due to low pressure operation, i.e., small leaks create contamination. Moreover, the tendency to crystallize can be a clogging problem. Operating at very low pressures is often impossible due to the freezing of water. Other absorption processes have been proposed, but all involve working fluids that are toxic, flammable, ozone-depleting, or have high atmospheric green house effects. The art lacks an environmentally friendly and efficient cycle that uses a non-toxic, non-corrosive working fluid with a positive working pressure.

SUMMARY OF THE INVENTION

The present invention is a safe, environmentally friendly absorptive cooling/heating process. The process uses a carbon dioxide absorption cycle that utilizes a liquid, non-toxic absorbent such as alcohol, from which the carbon dioxide gas is absorbed. Only the carbon dioxide refrigerant is circulated to the evaporator and condenser heat exchangers, the components directly in contact with breathable air, thus avoiding the problem of alcohol's flammability.

BRIEF DESCRIPTION OF THE DRAWING

The exact nature of this invention, as well as its objects and advantages, will become readily apparent upon reference to the following detailed description when considered in conjunction with the accompanying drawing, wherein the figure illustrates a schematic of the process for the heat pump of the present invention.

DESCRIPTION OF THE PREFERRED EMBODIMENTS

Figure 1:
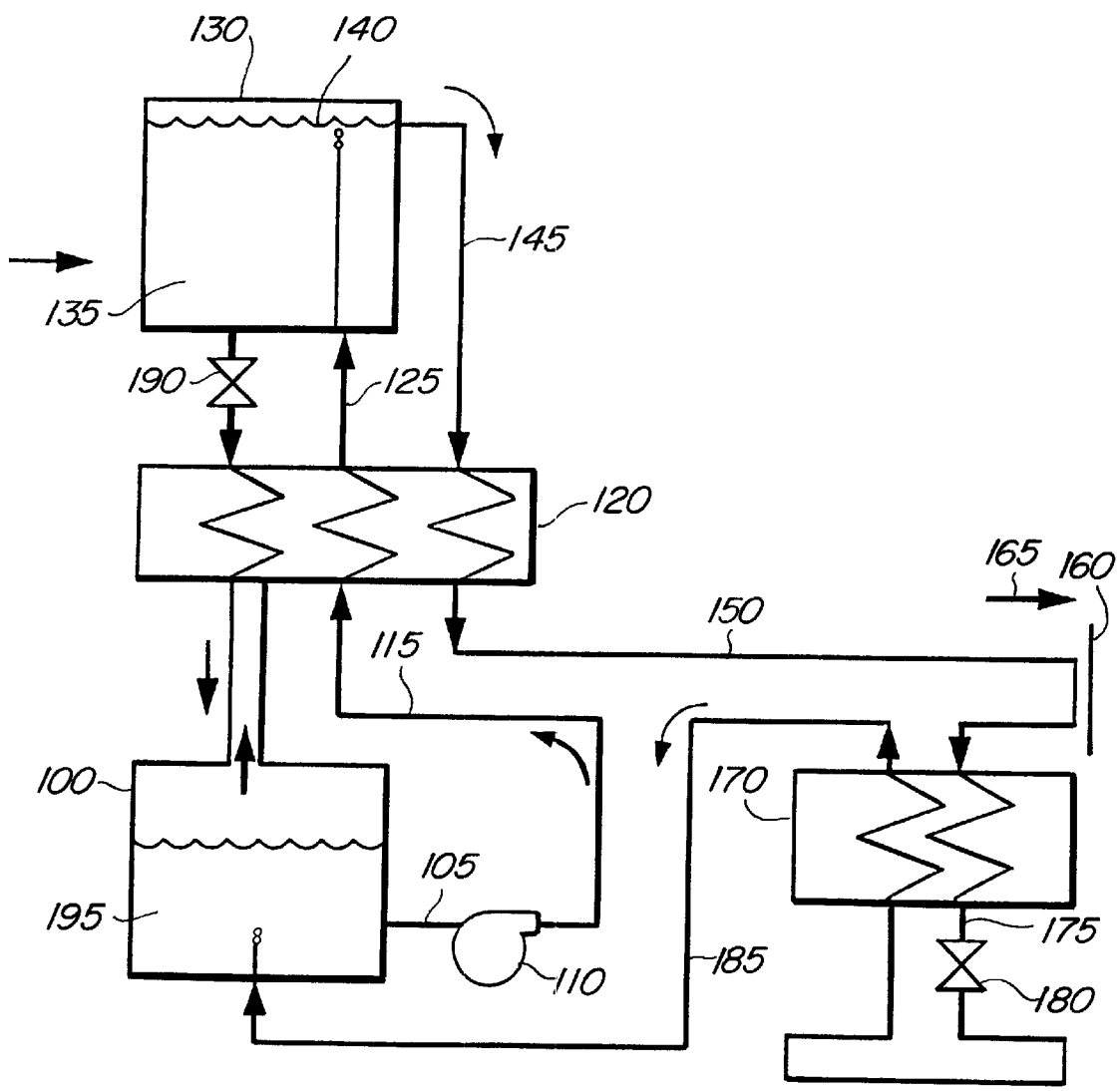

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a heat pump method and apparatus using carbon dioxide as the working fluid.

The preferred embodiment of the present invention described below comprises a generator, two heat exchangers, an absorber, and an evaporator. The generator heats the alcohol/carbon dioxide mixture to approximately 250° F., at which point carbon dioxide is vented. The carbon dioxide then passes through the heat exchanger, is pre-cooled and expanded, and passes through an evaporator to provide cooling at about 40° F. The $CO_2$ then passes back through a heat exchanger to an absorber where it is absorbed back into the solution and heat is released. A more detailed description is provided below.

FIG. 1 is a schematic diagram of a preferred embodiment of the present invention. A first reservoir, or "absorber" 100 stores a strong solution 195 of an absorbent such as alcohol, and carbon dioxide at low temperature such as 100° F. and a low pressure of 560 PSI. Numerical values are provided for illustrative purposes only and the invention is not limited a particular temperature or pressure discussed herein. The solution 195 is "strong" in that there is a higher concentration of the carbon dioxide dissolved in the alcohol as compared with a second reservoir of a "weak" solution to be discussed below.

The strong solution 195 of alcohol and carbon dioxide is directed through conduit 105 to a pump 110 that elevates the pressure of the solution to approximately 1400 PSI. The now high pressure solution is passed via conduit 115 through a heat exchanger 120 to increase the temperature in the solution to approximately 275° F. This high temperature solution is directed by conduit 125 to a second reservoir, or "generator" 130 in order to extract the carbon dioxide from the solution. From the high temperature high pressure solution 135, carbon dioxide gas 140 is boiled off or desorbed at the high temperature and pressure condition (250° F. and 1400 PSI) and directed through conduit 145. The weak alcohol solution 135 remaining after the quantity of carbon dioxide gas has been bled off is passed through an expansion valve 190 to reduce the pressure of the solution back to approximately 560 PSI, and then is directed to the heat exchanger 120 to recoup some of the heat used to heat the strong solution. After leaving the heat exchanger 120, the weak solution returns to the reservoir 100 where it is mixed with carbon dioxide gas returning from the cycle to regenerate the strong solution 195.

The quantity of high temperature, high pressure carbon dioxide gas 140 removed from the strong solution returns back through heat exchanger 120 to recoup some of the heat which in turn is used to heat more strong solution passing through the heat exchanger 120. Upon exiting the heat exchanger, the temperature of the $CO_2$ gas is approximately 175° and the pressure remains approximately 1400 PSI.

The $CO_2$ is delivered by conduit 150 to a super critical pre-cooler 160 to cool the gas to approximately 100° F. while providing heat represented by arrow 165 to the system. The decrease in the temperature of the carbon dioxide gas from approximately 175° to 100° occurs while the gas is in a super-critical state, enabling heat to be removed across a significant temperature range instead of at a single condenser temperature. The cooled super critical $CO_2$ gas next passes through a second heat exchanger 170 further reducing the temperature of the gas to approximately 60° F. At this point, the high pressure, low temperature carbon dioxide gas (partially liquefied) flows through conduit 175 to an expansion valve 180 where the carbon dioxide's pressure is reduced to approximately 560 PSI while the temperature is reduced still further to approximately 40° F. The now low temperature (40° F.), low pressure (560 PSI) gas is returned through the heat exchanger 170 to elevate the temperature of the gas to close to the original 100° F., although some loss is expected. The $CO_2$ gas then travels through conduit 185 back to reservoir 100 to regenerate the strong solution 195 and begin the cycle over again.

An advantage of the carbon dioxide cycle just discussed is the capacity to pre-cool the gas over a much larger super-critical temperature range compared to a common refrigerant such as R134a, which must be condensed at one specific temperature for a given pressure. Here, the carbon dioxide gas can be cooled in the super-critical regime from between about 200° F. and 100° F. depending upon the state of the gas exiting the heat exchanger 120, thus enabling heat to be removed from the system continuously within this range rather than limiting the heat extraction only at a specific temperature. This in turn significantly reduces the required heat exchanger mass.

The present invention has many potential practical applications, especially in the automobile air conditioning. Other applications include industrial heating and air conditioning systems. The present invention has a number of distinct advantages over existing systems of water/ammonia and LiBr in that the refrigerant is high pressure, thus requiring smaller heat exchangers, and utilizes a non-toxic working fluid. Furthermore, there is no potential for crystallization as is the case with LiBr. The application is also well suited for indoor applications because of the absence of toxic working fluids which may leak into human occupied spaces.

While alcohol is described as the absorbent for the present invention, other absorbents are also possible. Table 1 lists some additional absorbents for use with the present invention, Important parameters to consider are normal boiling point (NBP) higher normal boiling points are desired to minimize distillation heat losses, and toxicity. Generally, compounds that have high NBPs and are above 50 ppm toxicity should be considered safe, in that the amount of solvent in contact with the $CO_2$ is small and will become smaller if mixed with air should a leak occur. From Table 1, isobutyl acetate and amyl acetate are also good candidates for $CO_2$ absorption, as $CO_2$ absorbs well with acetates compared to alcohols, and these fluids have a relatively high normal boiling point (NBP) and low toxicity.

TABLE 1

$CO_2$ Solvents

| Compound | cc $CO_2$ dissolved/cc Solvent Ostwald Coefficient* | (° C.) NBP | TLV, ppm Toxicity | Comment |
|---|---|---|---|---|
| Water | 0.817 | 100 | — | low Ost. Coef. |
| Acetone | 6.38 | 56 | 750 | low NBP |
| Pyridine | 3.58 | 115 | 5 | toxic |
| Methyl Alcohol | 3.40 | 64 | 200 | low NBP |
| Ethyl Alcohol | 2.70 | 78 | 1000 | low Ost. coef. |
| Amyl Acetate | 4.40 | 148 | 100 | good |
| Acetate Acid | 4.82 | 118 | 10 | toxic |
| Heptane | 2.63 | 98 | 400 | low Ost. coef. |
| Isobutyl Acetate | 4.69 | 117 | 150 | good |
| Acetic Anhydride | 5.21 | 140 | 5 | toxic |

*1 atm., 25° C.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein, and particularly with other solvents for $CO_2$.

What is claimed is:

1. A process for delivering heat comprising the steps of:

providing a solution of carbon dioxide dissolved in an solution;

increasing the pressure of the solution;

increasing the temperature of the solution;

boiling off carbon dioxide from the solution at the increased pressure and temperature;

cooling the carbon dioxide in a super critical state across a temperature range and delivering heat thereby;

expanding the carbon dioxide; and returning the expanded carbon dioxide to the solution.

2. The process of claim 1 wherein the solution comprises alcohol and carbon dioxide.

3. The process of claim 1 wherein the solution comprises Isobutyl Acetate and carbon dioxide.

4. The process of claim 1 wherein the solution comprises Amyl Acetate and carbon dioxide.

5. The process of claim 1 wherein the solution comprises carbon dioxide and an absorbent, said absorbent having a normal boiling point (1 atm.) of greater than 50° C.

6. The process of claim 1 wherein the pressure throughout the system is positive relative to an ambient pressure.

7. The process of claim 1 wherein the increase in the pressure of the solution results in a pressure of at least 500 PSI.

8. A heat pump system wherein the super critical cooling of carbon dioxide alone is used to deliver heat comprising:

a solution of carbon dioxide in an absorbent;

a pump for pressurizing a quantity of the solution to an elevated pressure;

a heater for heating the quantity of the solution;

a channel for directing carbon dioxide gas absorbed from the heated quantity of said solution to a super-critical cooling apparatus where heat is removed only from the carbon dioxide gas in a super critical state;

an expansion valve for reducing the pressure of the cooled carbon dioxide gas; and a channel for directing the expanded cooled carbon dioxide back into the solution.

9. The heat pump of claim 8 further comprising a first heat exchanger for exchanging heat between said carbon dioxide gas and said quantity of solution.

10. The heat pump of claim 9 further comprising a second heat exchanger for exchanging heat between said cooled carbon dioxide gas and said expanded carbon dioxide gas.

11. The heat pump of claim 8 wherein the absorbent comprises alcohol.

12. The heat pump of claim 8 wherein the absorbent comprises Isobutyl Acetate.

13. The heat pump of claim 8 wherein the absorbent comprises Amyl Acetate.

14. The heat pump of claim 8 wherein the absorbent has a normal boiling point (1 atm.) of greater than 50° C.

* * * * *